United States Patent
Soekawa (10) Patent No.: US 9,124,352 B2
(45) Date of Patent: Sep. 1, 2015

(54) DATA COMMUNICATION TERMINAL APPARATUS

(71) Applicant: FUJITSU LIMITED, Kawasaki-shi (JP)

(72) Inventor: Kouji Soekawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 13/714,536

(22) Filed: Dec. 14, 2012

(65) Prior Publication Data

US 2013/0244596 A1 Sep. 19, 2013

(30) Foreign Application Priority Data

Mar. 16, 2012 (JP) .................. 2012-061263

(51) Int. Cl.
| | |
|---|---|
| H04B 1/40 | (2015.01) |
| G06F 1/16 | (2006.01) |
| H01Q 1/22 | (2006.01) |
| H01Q 9/42 | (2006.01) |
| H01Q 21/28 | (2006.01) |

(52) U.S. Cl.
CPC ............... *H04B 1/40* (2013.01); *G06F 1/1698* (2013.01); *H01Q 1/2275* (2013.01); *H01Q 9/42* (2013.01); *H01Q 21/28* (2013.01)

(58) Field of Classification Search
CPC .. H04B 7/0469; H04B 1/1009; H04B 10/803; H04B 1/40; H01Q 1/2283; H01Q 9/0407; H01Q 5/0037

USPC .......... 455/82, 550.1, 562.1, 575.7, 121, 129; 343/829, 847, 859

See application file for complete search history.

(56) References Cited

U.S. PATENT DOCUMENTS

| | | | |
|---|---|---|---|
| 2003/0174095 A1* | 9/2003 | Sievenpiper .................. | 343/770 |
| 2004/0227672 A1* | 11/2004 | Chen et al. .................... | 343/702 |
| 2005/0024275 A1* | 2/2005 | Jo et al. ........................ | 343/702 |
| 2007/0152833 A1* | 7/2007 | Kaplan et al. ............. | 340/572.8 |
| 2008/0025008 A1* | 1/2008 | Kochis et al. ................. | 361/760 |
| 2008/0143611 A1* | 6/2008 | Wang ............................ | 343/702 |
| 2009/0207092 A1* | 8/2009 | Nysen et al. .................. | 343/876 |
| 2010/0013732 A1* | 1/2010 | Kapuliansky et al. ........ | 343/866 |
| 2011/0122035 A1* | 5/2011 | Montgomery et al. ....... | 343/727 |

FOREIGN PATENT DOCUMENTS

JP 2008-205604 9/2008

* cited by examiner

*Primary Examiner* — Andrew Wendell
(74) *Attorney, Agent, or Firm* — Fujitsu Patent Center (57) ABSTRACT

A data communication terminal apparatus is disclosed that includes a printed circuit board, a ground plane formed in the printed circuit board, a connector disposed on an end portion of the printed circuit board, and an antenna configured to have a feeding portion at one end and another end, the other end being connected to the ground plane via a capacitor between the feeding portion and the connector, the antenna forming a loop with the ground plane.

14 Claims, 8 Drawing Sheets

DATA COMMUNICATION TERMINAL APPARATUS

CROSS-REFERENCE TO RELATED APPLICATIONS

This patent application is based upon and claims the benefit of priority of the prior Japanese Patent Application No. 2012-061263 filed on Mar. 16, 2012, the entire contents of which are incorporated herein by reference.

FIELD

The embodiments discussed herein are related to a data communication terminal apparatus.

BACKGROUND

Conventionally, there has been an antenna apparatus which includes a printed circuit board having a ground plate on which an electric circuit of a communication terminal is mounted, a radio frequency (RF) power source mounted on the printed circuit board, and a variable reactance element mounted on the printed circuit board and located in an opposite area from the RF power source. One end of the RF power source is connected to one end of the ground plate, and one end of the variable reactance element is connected to the other end of the ground plate.

The antenna apparatus further includes a first connector of which one end is connected to the other end of the RF power source, a second connector of which one end is connected to the other end of the variable reactance element, and a dielectric body or a ground body to which the other end of the first connector or the second connector is connected.

The RF power source, the first connector, the ground body, the second connector, the variable reactance element and the ground plate form a current path, and thereby a loop antenna is formed which uses the ground plate as a radiation element.

The conventional antenna apparatus as described above is used in a reader writer which reads a radio frequency identifier (RFID) tag, for example.

Accordingly, it is difficult to install the conventional antenna apparatus in a card type data communication apparatus of which a connector is inserted into the card type data communication apparatus in order to connect the card type data communication apparatus to an information processing apparatus such as a personal computer (PC) or the like.

In order to install an antenna apparatus in the card type data communication apparatus which is connected to the information processing apparatus such as the PC or the like, it is required that the antenna apparatus can be installed in a limited small space of the card type data communication apparatus and can provide high communication performance.

For example, according to a data communication terminal apparatus including a main antenna and a sub-antenna that use a multiple-input multiple-output (MIMO) technique, it is easy to obtain good antenna characteristics by locating the main antenna away from a connector of the data communication terminal apparatus. On the contrary, since the sub-antenna is located away from the main antenna, it is difficult for the sub-antenna to obtain good antenna characteristics.

In general, it is not easy for an antenna which is located close to an information processing apparatus including ground wirings to obtain good antenna characteristics. Accordingly, in the antenna apparatus which uses MIMO technique as described above, the main antenna having priority order is located away from the information apparatus, and the sub-antenna is located close to the information processing apparatus so that a correlation between the main antenna and the sub-antenna is lowered.

PRIOR ART REFERENCES

Patent Reference

[Patent Reference 1] Japanese Patent Laid-Open Publication No. 2008-205604

SUMMARY

According to an aspect of an embodiment, there is provided a data communication terminal apparatus including a printed circuit board, a ground plane formed in the printed circuit board, a connector disposed on an end portion of the printed circuit board, and an antenna configured to have a feeding portion at one end and another end, the other end being connected to the ground plane via a capacitor between the feeding portion and the connector, the antenna forming a loop with the ground plane.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

DESCRIPTION OF EMBODIMENTS

A description is given, with reference to the accompanying drawings, of embodiments of a data communication terminal apparatus.

Prior to illustration of the embodiments of data communication terminal apparatus, a comparative example of data communication terminal apparatus is described with reference to FIGS. 1 to 4.

COMPARATIVE EXAMPLE

Figure 1A:
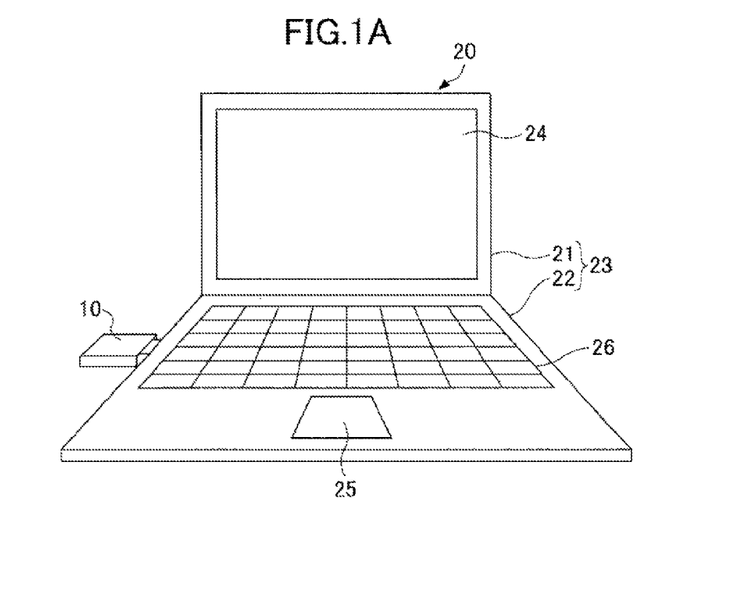
FIG. 1A is a diagram illustrating an oblique perspective view of a data communication terminal apparatus of a comparative example which is connected to a laptop PC.
Figure 1B:
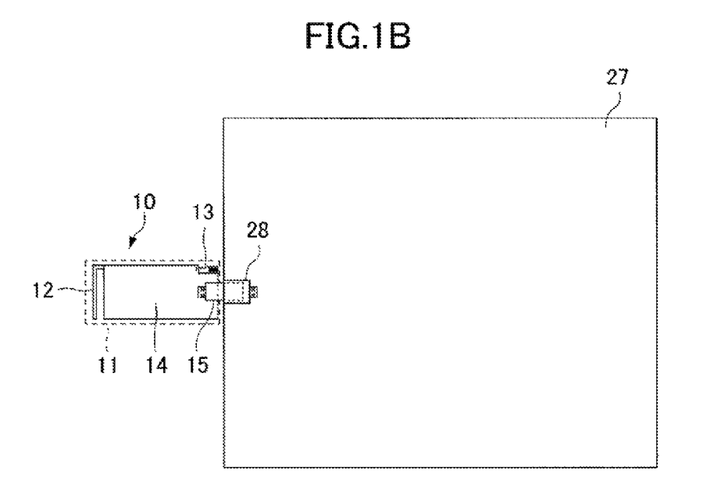
FIG. 1B is a diagram illustrating a positional relationship among a ground layer and an antenna of the data communication terminal apparatus of the comparative example and a ground layer of the laptop PC.

FIG. 1A is a diagram illustrating an oblique perspective view of a data communication terminal apparatus 10 of the comparative example which is connected to a laptop PC 20. FIG. 1B is a diagram illustrating a positional relationship among a ground layer 14 and an antenna 12 of the data communication terminal apparatus 10 of the comparative example and a ground layer 27 of the laptop PC 20.

The laptop PC 20 as illustrated in FIG. 1A includes a housing 23 which includes a cover part 21 and a base part 22. The cover part 21 holds a display 24.

A touch pad 25 and a keyboard 26 are disposed on the base part 22. A universal serial bus (USB) terminal is disposed on a left side surface of the base part 22. In FIG. 1A, the data communication terminal apparatus 10 of the comparative example is connected to the USB terminal of the laptop PC 20.

The cover part 21 is pivotably supported by the base part 22 and is openable and closable with respect to the base part 22. Although the cover part 21 is opened with respect to the base part 22 as illustrated in FIG. 1A, the display 24 faces the keyboard 26 when the cover part 21 is closed.

A liquid crystal display may be used as the display 24, for example. The touch pad 25 is disposed on the base part 22 and is located in front of the keyboard 26 and in the middle of a width direction (a lateral direction in FIG. 1A) of the base part 22.

In FIG. 1B, the positional relationship of a printed circuit board 11, the main antenna 12, a sub-antenna 13, the ground layer 14 and a USB plug 15 is illustrated in a state where a housing of the data communication terminal apparatus 10 of the comparative example is dismounted. The printed circuit board 11 as illustrated by dashed lines is a type of multilayer printed circuit board which includes plural conductive layers. The main antenna 12 and the sub-antenna 13 are formed in the top layer (L1 layer) of the conductive layers, and the ground layer 14 is formed in the second top layer (L2 layer) of the conductive layers, for example. The USB plug 15 is connected to inner layers (not shown) and the ground layer 14 of the data communication terminal apparatus 10.

In FIG. 1B, the printed circuit board 11 is illustrated by dashed lines in order to illustrate the positional relationship of the main antenna 12, the sub-antenna 13, the ground layer 14 and the USB plug 15 clearly.

A USB receptacle 28 is mounted onto the ground layer 27 of the laptop PC 20.

The data communication terminal apparatus 10 is attached to the laptop PC 20 by inserting the USB plug 15 into the USB receptacle 28 of the laptop PC 20.

Figure 2:
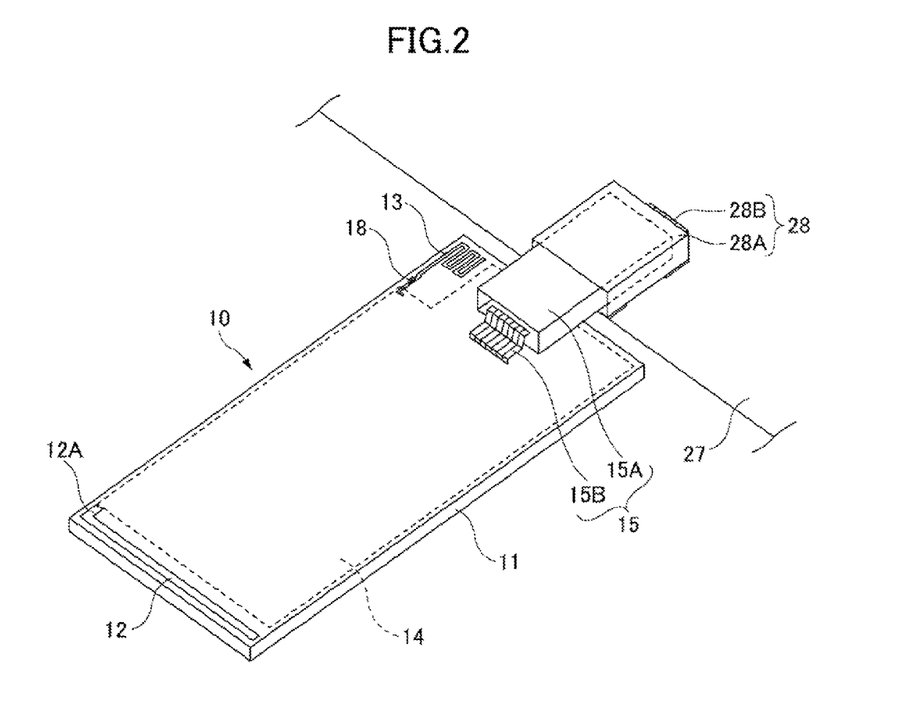
FIG. 2 is a diagram illustrating internal configurations of the data communication terminal apparatus of the comparative example.

FIG. 2 is a diagram illustrating internal configurations of the data communication terminal apparatus 10 of the comparative example. In FIG. 2, the printed circuit board 11, the main antenna 12, the sub-antenna 13, the ground layer 14 and the USB plug 15 are illustrated in a state where the housing of the data communication terminal apparatus 10 of the comparative example is dismounted. Further, in FIG. 2, the ground layer 27 and the USB receptacle 28 of the laptop PC 20 are illustrated.

The main antenna 12 is an L shaped monopole antenna which is disposed on a side of one end of the printed circuit board 11 having a rectangular shape. A feeding portion 12A of the main antenna 12 is formed in the L1 layer of the printed circuit board 11. The feeding portion 12A is fed via a microstrip line or the like (not shown). Length of the main antenna 12 is a quarter of a wavelength A (quarter wavelength) at a communication frequency of the data communication terminal apparatus 10. Although the embodiment in which the main antenna 12 is the L shaped monopole antenna is illustrated, the shape of the main antenna 12 may not be limited to an L shape. The main antenna 12 may not be limited to the monopole antenna, and may be a dipole antenna.

The main antenna 12 is disposed in an area which is farthest from the ground layer 27 of the laptop PC 20. The USB plug 15 is disposed on the opposite side of the data communication terminal apparatus 10 from the main antenna 12 in the longitudinal direction of the data communication terminal apparatus 10.

The sub-antenna 13 is disposed beside the USB plug 15 which is located on the opposite side from one end where the main antenna 12 of the printed circuit board 11 is disposed. The sub-antenna 13 includes a meander shaped line. A detailed configuration of the sub-antenna 13 will be described later with reference to FIGS. 3A and 3B.

Since the ground layer 14 is formed in the L2 layer as described above, the ground layer 14 is illustrated by dashed lines in FIG. 2.

The USB plug 15 is mounted on a surface of the printed circuit board 11 and is a type of plug adjusted to USB 3.0 standard.

The USB plug 15 includes a shell part 15A and a terminal 15B. The shell part 15A is made of metal such as steel and is a type of tubular member having a rectangular shaped cross section. The terminal 15B is inserted through the shell part 15A and is connected to the ground layer 14, an L3 layer or the like through vias, etc. The shell part 15A is connected to the ground layer 14 and is kept at ground potential. One of lines of the terminal 15B is connected to the ground layer 14.

The USB receptacle 28 includes a shell part 28A and a terminal 28B in a similar manner to the USB plug 15. The shell part 28A is made of metal such as steel and is a type of tubular member having a rectangular shaped cross section. The shell part 28A has an inner size which corresponds to an outer size of the shell part 15A of the USB plug 15. The shell part 15A fits and is electrically connected to the shell part 28A when the shell part 15A is inserted into the shell part 28A. The shell part 28A is connected to the ground layer 27 and is kept at the ground potential.

The terminal 28B is inserted through the shell part 28A. One of lines of the terminal 28B is connected to the ground layer 27, and the rest of the lines of the terminal 28B are connected to conductive layers of the printed circuit board 11.

Figure 3A:
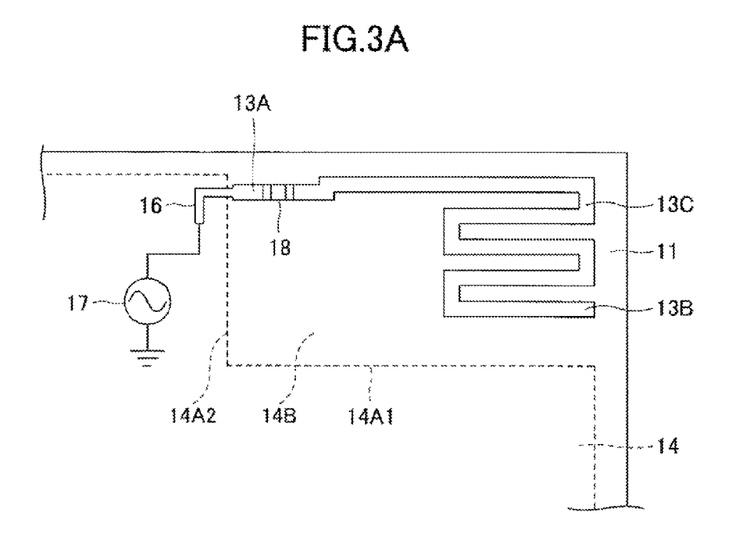
FIG. 3A is a diagram illustrating a plan view of a sub-antenna of the data communication terminal apparatus of the comparative example.
Figure 3B:
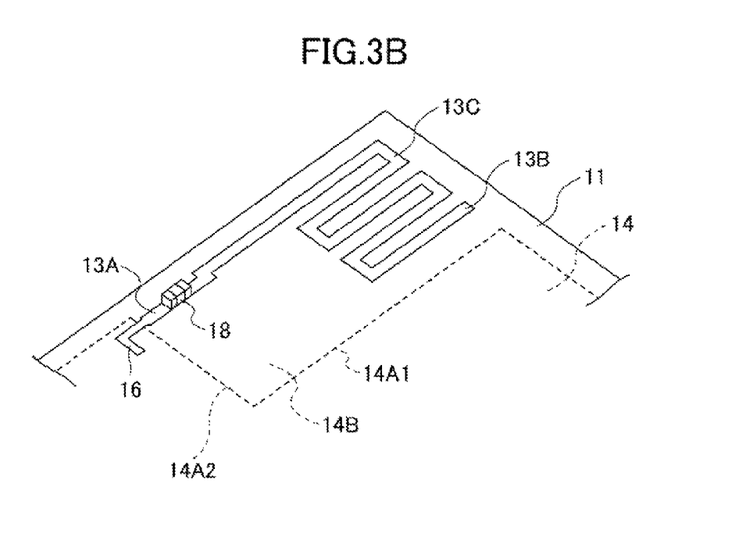
FIG. 3B is a diagram illustrating an oblique perspective view of the sub-antenna of the data communication terminal apparatus of the comparative example.

FIG. 3A is a diagram illustrating a plan view of the sub-antenna 13 of the data communication terminal apparatus 10 of the comparative example. FIG. 3B is a diagram illustrating an oblique perspective view of the sub-antenna 13 of the data communication terminal apparatus 10 of the comparative example.

The sub-antenna 13 is disposed in an area where the ground layer 14 is not formed. The sub-antenna 13 is formed in the L1 layer of the printed circuit board 11, and the ground layer 14 is formed in the L2 layer of the printed circuit board 11. The area is located at a corner portion of the printed circuit board 11 and has a rectangular shape. The area is referred to as a rectangular cutout portion 14B. As illustrated in FIGS. 3A and 3B, the ground layer 14 has edges 14A1 and 14A2 that are formed along the rectangular cutout portion 14B.

As illustrated in FIG. 3A, the feeding portion 13A of the sub-antenna 13 is connected to the RF generator 17 via the microstrip line 16 which is formed in the L1 layer of the printed circuit board 11. Although the RF generator 17 is expressed in a symbol, the RF generator 17 is mounted onto the surface of the printed circuit board 11 in a practical sense.

The other end 13B of the sub-antenna 13 is an open end. The sub-antenna 13 includes a meander portion 13C. The meander portion 13C is formed for the purpose of obtaining a sufficient length of the sub-antenna 13 in a small area. An inductor 18 is inserted into the sub-antenna 13 in a portion close to the feeding portion 13A in order to control an effective length of the sub-antenna 13.

The sub-antenna 13 is a monopole antenna. Length of the sub-antenna 13 between the feeding portion 13A and the other end 13B is a quarter of a wavelength λ (quarter wavelength) at the communication frequency of the data communication terminal apparatus 10.

The data communication terminal apparatus 10 according to the comparative example is attached to the laptop PC 20 by inserting the USB plug 15 into the USB receptacle 28 of the laptop PC 20.

The laptop PC 20 includes the ground layer 27 which is several times as big as the ground layer 14 of the data communication terminal apparatus in plan view.

Accordingly, the data communication terminal apparatus 10 is affected by the ground layer 27 when the data communication terminal apparatus 10 performs communication in a state where the data communication terminal apparatus 10 is attached to the laptop PC 20. The closer to the USB plug 15 an area of the data communication terminal apparatus 10 is, the more the communication is affected by the ground layer 27.

For the reasons as described above, the main antenna 12 is located in the farthest portion from the USB plug 15.

For example, in a case where the main antenna 12 and the sub-antenna 13 perform communication simultaneously by using a MIMO technique, it is required that correlation between the main antenna 12 and the sub-antenna 13 is low and isolation therebetween is high in order to obtain enhanced antenna characteristics of the main antenna 12 and the sub-antenna 13.

Accordingly, it is preferable to arrange the sub-antenna 13 in a position as far as possible from the main antenna 12. For this reason, the sub-antenna 13 is disposed beside the USB plug 15.

By the way, the other end 13B of the sub-antenna 13 of the data communication terminal apparatus 10 of the comparative example is an open end. Therefore, in the sub-antenna 13, current is flowing from the feeding portion 13A to the other end 13B via the meander portion 13C.

On the contrary, in the ground layer 14, current is flowing to the feeding portion 13A. Particularly, in an area close to the edge 14A1 as illustrated in FIG. 3A, the current is flowing in the direction from right to left along the edge 14A1.

Accordingly, in the data communication terminal apparatus 10 of the comparative example, direction of the current flowing through the sub-antenna 13 and direction of the current flowing in the area close to the edge 14A1 are opposite to each other. Therefore, an electromagnetic field generated by the current flowing through the sub-antenna 13 and an electromagnetic field generated by the current flowing in the area close to the edge 14A1 cancel each other. As a result, the antenna characteristics of the data communication terminal apparatus 10 are degraded.

Figure 4:
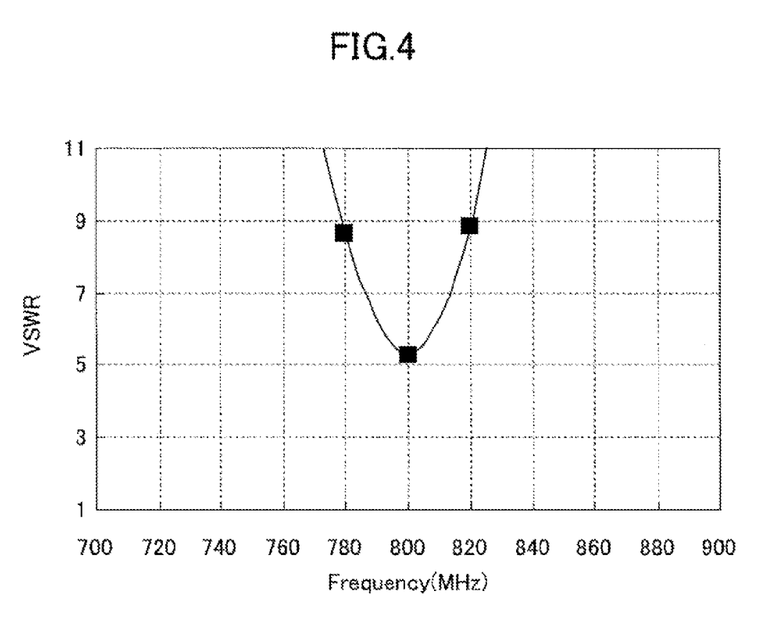
FIG. 4 is a diagram illustrating voltage standing wave ratio (VSWR) characteristics of the sub-antenna of the data communication terminal apparatus according to the comparative example.

FIG. 4 is a diagram illustrating voltage standing wave ratio (VSWR) characteristics of the sub-antenna 13 of the data communication terminal apparatus 10 according to the comparative example. The VSWR characteristics as illustrated in FIG. 4 are obtained by a simulation which is performed in a condition where the data communication terminal apparatus 10 is attached to the laptop PC 20, where an inductance of the inductor 18 is set to 120 nH and where there is no joule loss. Herein, the communication frequency of the sub-antenna 13 is set to 800 MHz, and the sizes of the sub-antenna 13 are designed for 800 MHz.

As illustrated in FIG. 4, the VSWR characteristics indicate that the VSWR value is about 5 at 800 MHz. Accordingly, it turns out that there are many reflected waves (returning waves) in the sub-antenna 13 and that radiation efficiency is decreased. Further, there is a large power loss caused by impedance mismatch. The practical sub-antenna 13 incurs joule loss. Therefore, the radiation efficiency of the practical sub-antenna 13 will be further decreased. Herein, a direct current resistance component of the inductor 18 is about 10Ω. The joule loss is caused by the inductor 18.

A possible cause of the decreased radiation efficiency is that the directions of the currents flowing in the sub-antenna 13 and the area close to the edge 14A1 are opposite to each other as described above.

<Embodiment>

Figure 5A:
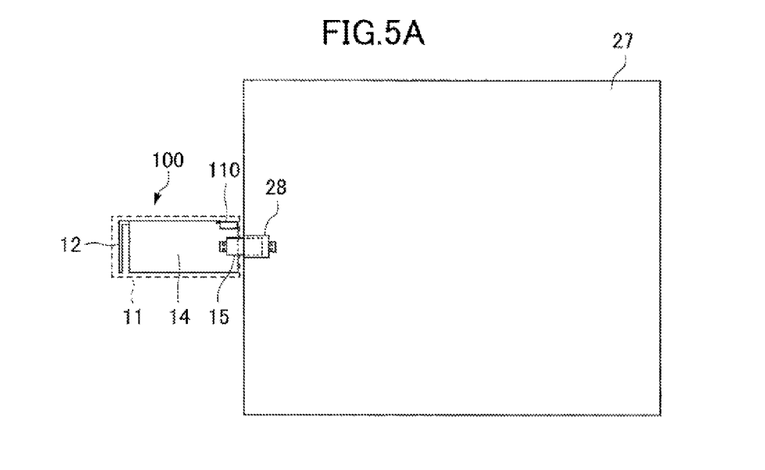
FIG. 5A is a diagram illustrating a plan view of an internal configuration of a data communication terminal apparatus of an embodiment.
Figure 5B:
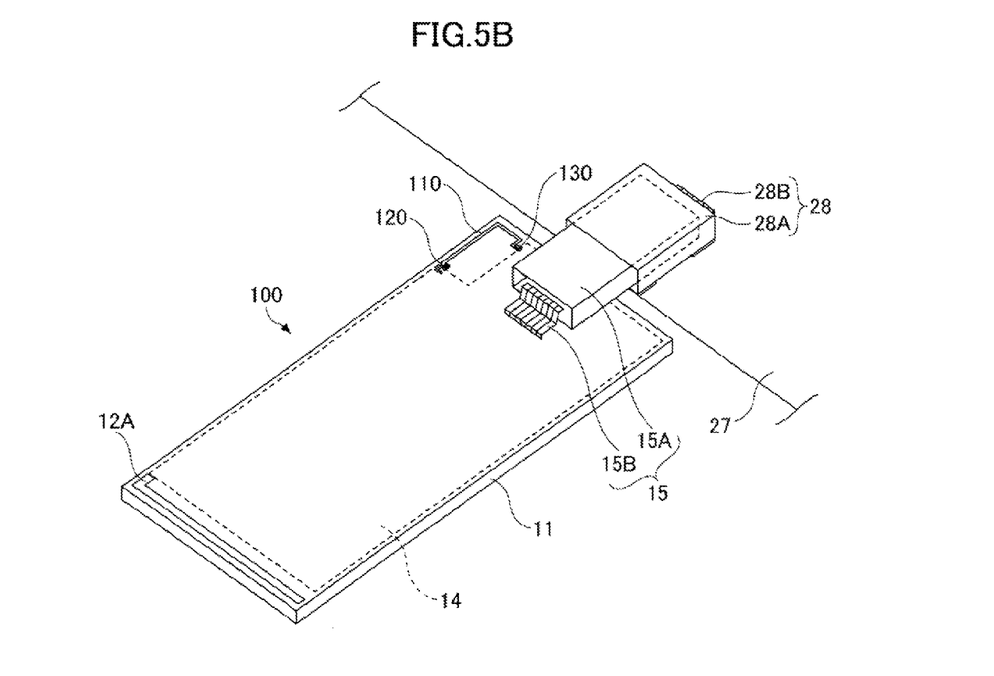
FIG. 5B is a diagram illustrating an oblique perspective view of the internal configuration of the data communication terminal apparatus of the embodiment.

FIG. 5A is a diagram illustrating a plan view of an internal configuration of a data communication terminal apparatus 100 of the embodiment. FIG. 5B is a diagram illustrating an oblique perspective view of the internal configuration of the data communication terminal apparatus 100 of the embodiment.

The data communication terminal apparatus 100 according to the present embodiment includes a sub-antenna 110 instead of the sub-antenna 13 included in the data communication terminal apparatus 10 according to the comparative example. Otherwise, the data communication terminal apparatus 100 according to the embodiment is similar to the data communication terminal apparatus 10 of the comparative example. Accordingly, the same elements as or elements similar to those of the data communication terminal apparatus 10 of the comparative example are referred to by the same reference numerals, and a description thereof is omitted.

In FIG. 5A, the positional relationship of the printed circuit board 11, the main antenna 12, the sub-antenna 110, the ground layer 14 and the USB plug 15 is illustrated in a similar manner to FIG. 1B. In FIG. 5A, the positional relationship is illustrated in a state where the housing of the data communication terminal apparatus 100 of the embodiment is dismounted. For example, the sub-antenna 110 is formed in the top layer (L1 layer) of plural of the conductive layers.

In FIG. 5A, the printed circuit board 11 is illustrated by dashed lines in order to illustrate the positional relationship of the main antenna 12, the sub-antenna 110, the ground layer 14 and the USB plug 15 clearly.

Herein, the ground layer 14 is one example of a ground plane, the USB plug 15 is one example of a connector and the sub-antenna 110 is one example of an antenna.

The data communication terminal apparatus 100 is attached to the laptop PC 20 by inserting the USB plug 15 into the USB receptacle 28 of the laptop PC 20.

FIG. 5B is a diagram illustrating an oblique perspective view of the printed circuit board 11, the main antenna 12, the sub-antenna 110, the ground layer 14, the USB plug 15, the ground layer 27 and the USB receptacle 28. The printed circuit board 11, the main antenna 12, the sub-antenna 110, the ground layer 14 and the USB plug 15 are included in the data communication terminal apparatus 100. The ground layer 27 and the USB receptacle 28 are included in the laptop PC 20.

The sub-antenna 110 is disposed beside the USB plug 15 which is located on the opposite side from one end where the main antenna 12 of the printed circuit board 11 is disposed. A detailed configuration of the sub-antenna 110 will be described later with reference to FIGS. 6A and 6B.

Figure 6A:
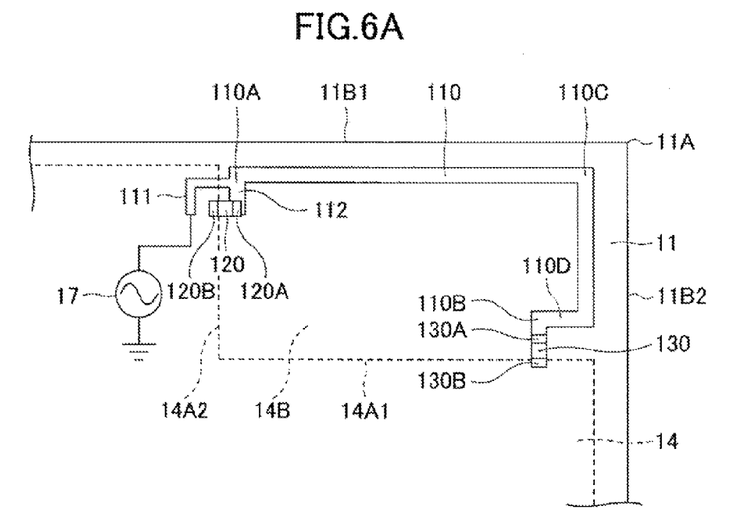
FIG. 6A is a diagram illustrating a plan view of a sub-antenna of the data communication terminal apparatus of the embodiment.
Figure 6B:
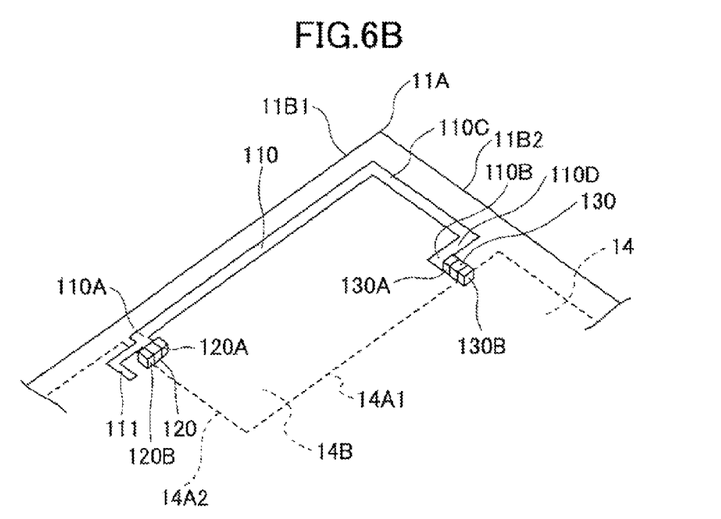
FIG. 6B is a diagram illustrating an oblique perspective view of the sub-antenna of the data communication terminal apparatus of the embodiment.

FIG. 6A is a diagram illustrating a plan view of the sub-antenna 110 of the data communication terminal apparatus 100 of the embodiment. FIG. 6B is a diagram illustrating an oblique perspective view of the sub-antenna 110 of the data communication terminal apparatus 100 of the embodiment.

The sub-antenna 110 is provided in an area where the ground layer 14 is not formed. The area is located at a corner portion which is located around an apex 11A of the printed circuit board 11 and has a rectangular shape. The sub-antenna 110 is formed in the L1 layer of the printed circuit board 11, and the ground layer 14 is formed in the L2 layer of the printed circuit board 11. In the printed circuit board 11, there is a insulating layer between the L1 layer and the L2 layer. The area is referred to as a rectangular cutout portion 14B. The rectangular shape of the rectangular cutout portion 14B is defined by the edges 14A1 and 14A2 and two edges 11B1 and 11B2 of the printed circuit board 11 that contact at the apex 11A with each other.

As illustrated in FIG. 6A, a feeding portion 110A, which is one end of the sub-antenna 110, is connected to the RF generator 17 via a microstrip line 111 which is formed in the L1 layer of the printed circuit board 11.

Although the embodiment in which the microstrip line 111 is connected to the feeding portion 110A is described, the feeding portion 110A and the RF generator 17 maybe connected via a line besides the microstrip line 111 as long as a characteristic impedance of the line is 50Ω. Accordingly, the line of which the characteristic impedance of the line is 50Ω may be used instead of the microstrip line 111.

An extending part 112 is connected to the feeding portion 110A. One end 120A of an inductor 120 is connected to the extending part 112.

The inductor 120 is provided for the purpose of matching the impedance of the sub-antenna 110 and obtaining enhanced VSWR characteristics. Accordingly, the one end 120A of the inductor 120 is connected to the extending part 112, and another end 120B of the inductor 120 is connected to a pad which is formed on the surface of the printed circuit board 11. The pad is connected to the ground layer 14 (L2 layer) via a through hole which is formed in the insulating layer of the printed circuit board 11. Since the pad is located under the other end 120B, the pad is not illustrated in FIGS. 6A and 6B.

The inductor 120 is different from the inductor 18 of the comparative example in that the inductor 120 is connected in parallel with the microstrip line 111 and the RF generator 17 between the feeding portion 110A and the ground layer 14. The inductor 120 and the extending part 112 are one example of a matching circuit which is provided for the purpose of matching the impedance of the sub-antenna 110.

The one end 120A of the inductor 120 and the extending part 112 may be connected by solder or the like, for example. The other end 120 B and the pad which is connected to the ground layer 14 (L2 layer) via the through hole formed in the insulating layer may be connected by solder or the like, for example.

The sub-antenna 110 extends toward the apex 11A of the printed circuit board 11 from the feeding portion 110A, and bends at a bent portion 110C at a right angle along the edge 11B2 of the printed circuit board 11. The sub-antenna 110 extends toward the edge 14A1 from the bent portion 110C along the edge 11B2. Another end 110B of the sub-antenna 110 is connected to the ground layer 14 (L2 layer) via a capacitor 130. The sub-antenna 110 is an L shaped antenna.

One end 130A of the capacitor 130 is connected to the other end 110B of the sub-antenna 110, and another end 130B of the capacitor 130 is connected to a pad provided on the surface of the printed circuit board 11. The pad is connected to the ground layer 14 (L2 layer) via a through hole formed in the insulating layer of the printed circuit board 11. Although the sub-antenna 110 has a bent portion 110D which is located on the near side of the other end 110B, the sub-antenna 110 may not have the bent portion 110D. In this case, the sub-antenna 110 may extend straight toward the other end 110B from the bent portion 110C.

The one end 130A of the capacitor 130 is connected to the other end 110B of the sub-antenna 110 by solder or the like. The other end 130B of the capacitor 130 is connected to the pad provided on the surface of the printed circuit board 11 near the edge 14A1. The pad is connected to the ground layer 14 (L2 layer) via the through hole formed in the insulating layer of the printed circuit board 11. Since the pad is located under the other end 130B of the capacitor 130, the pad is not illustrated in FIGS. 6A and 6B. The capacitor 130 may be a capacitor chip mounted on the printed circuit board 11. Alternatively, the capacitor 130 may be a capacitor which is formed between an edge portion of the sub-antenna 110 which faces an edge portion of the ground layer 14 instead of or in addition to the capacitor chip. In this case, the capacitor 130 is formed by the edge portion of the sub-antenna 110 and the edge portion of the ground layer 14 in plan view.

In the data communication terminal apparatus 100, the feeding portion 110A which constitutes the one end of the sub-antenna 110 is connected to the RF generator 17, and the other end 110B is connected to the ground layer 14 via the capacitor 130. The RF generator 17 is grounded.

In the data communication terminal apparatus 100, the sub-antenna 110 forms a loop (a loop circuit) with the ground layer 14.

In the data communication terminal apparatus 100, the sub-antenna 110 has the feeding portion 110A which constitutes the one end of the sub-antenna 110. The other end 110B is connected to the ground layer 14 via the capacitor 130 at a point between the feeding portion 110A and the USB plug 15. The sub-antenna 110 forms a loop with edge portions located along the edges 14A1 and 14A2. The edge portions are portions of the ground layer 14 that are located along the edges 14A1 and 14A2.

In the data communication terminal apparatus 100, a parasitic inductance L of the sub-antenna 110 and a capacitance C of the capacitor 130 form an LC resonance circuit. Herein, inductance of the inductor 120 contributes very little to a resonance frequency of the LC circuit.

Accordingly, in the sub-antenna 110 and the ground layer 14, a loop of current is formed which flows from the feeding portion 110A to the other end 110B via the bent portion 110C and returns to the feeding portion 110A along the edges 14A1 and 14A2 of the ground layer 14. In FIGS. 6A and 6B, the loop of the current is formed in a clockwise fashion by the LC resonance circuit as described above.

Figure 7A:
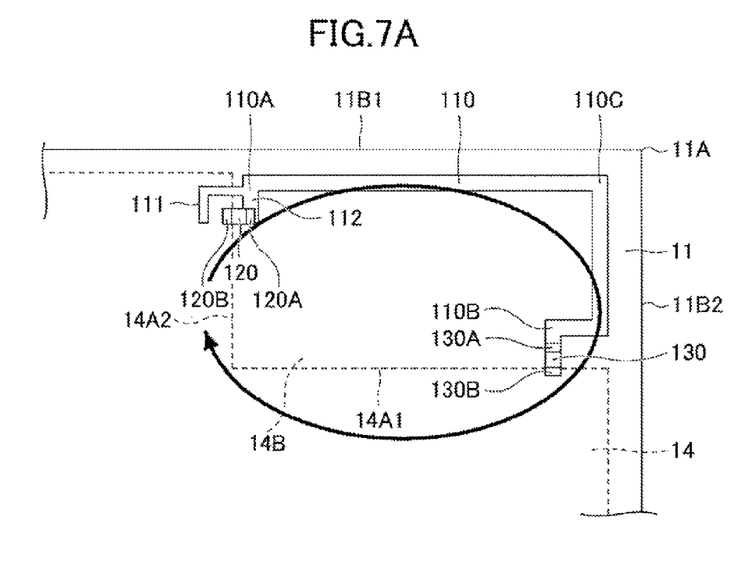
FIG. 7A is a diagram illustrating a flow of a current in the data communication terminal apparatus.
Figure 7B:
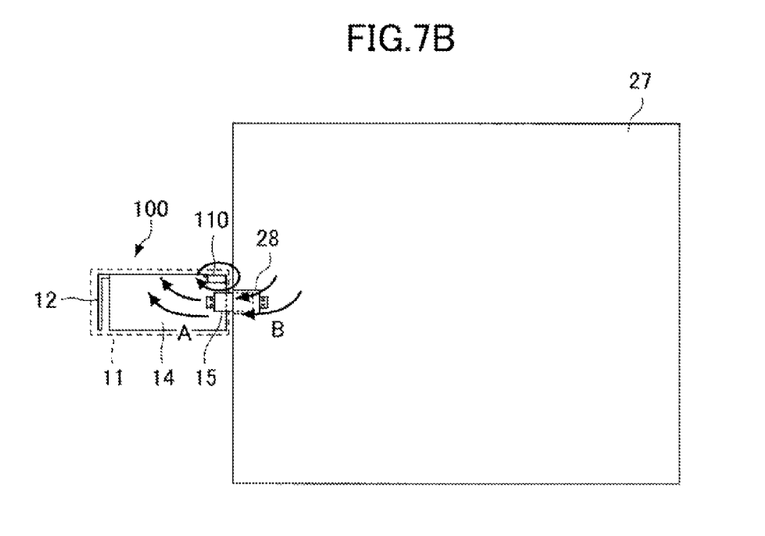
FIG. 7B is a diagram illustrating a flow of a current in the data communication terminal apparatus.

FIGS. 7A and 7B are diagrams illustrating a flow of the current in the data communication terminal apparatus 100. FIG. 7A illustrates the flow of the current in an enlarged view around the sub-antenna 110. FIG. 7B illustrates the flow of the current in a state where the data communication terminal apparatus 100 is connected to the laptop PC 20.

In the loop, the current starts from the feeding portion 110A, flows in the sub-antenna 110 and the ground layer 14 and returns to the feeding portion 110A in a clockwise fashion as indicated by an arrow as illustrated in FIG. 7A.

When the data communication terminal apparatus 100 is connected to the laptop PC 20 and communicates with a server or the like via the Internet, current is induced in the ground layer 27 of the laptop PC 20. The induced current flows in a swirl pattern in a direction as indicated by arrows A and B as illustrated in FIG. 7B.

In a state where the data communication terminal apparatus 100 is connected to the laptop PC 20, the ground layer 14 and the ground layer 27 are connected by the USB plug 15 and the USB receptacle 28. In this state, the ground layer 14 and the ground layer 27 behave as a single ground layer.

In this state, when the data communication terminal apparatus 100 performs communication and the current flows in the loop as illustrated in FIG. 7A, the induced current flows in the ground layer 14 in the direction indicated by the arrows A and in the ground layer 27 in the direction indicated by the arrows B as illustrated in FIG. 7B. The induced current flows to the left centered on the USB receptacle 28 in a concentric fashion. In the ground layer 27, the induced current is generated by an excitation caused by the current which is generated by the LC circuit and flows through the ground layer 14.

A current distribution as described above is similar to one which is obtained in a state where an antenna which has a line-symmetric shape with the sub-antenna 110 is disposed on the ground layer 27. In other words, the current distribution as described above is similar to the one obtained in a state where a dipole antenna which includes the sub-antenna 110 and an antenna having the line-symmetric shape is disposed.

In the data communication terminal apparatus 100, it is possible to use a part of the ground layer 27 of the laptop PC 20 as a ground element of the sub-antenna 110. In other words, it is possible to increase the ground plane of the sub-antenna 110 in addition to the ground layer 14. Accordingly, the sub-antenna 110 behaves as a larger antenna than in reality.

As a result, according to the data communication terminal apparatus 100, it is possible to obtain enhanced antenna characteristics that make it possible to obtain the current distribution as illustrated in FIG. 7B, if the data communication terminal apparatus 100 performs communication in a state where the data communication terminal apparatus 100 is connected to the laptop PC 20.

Figure 8:
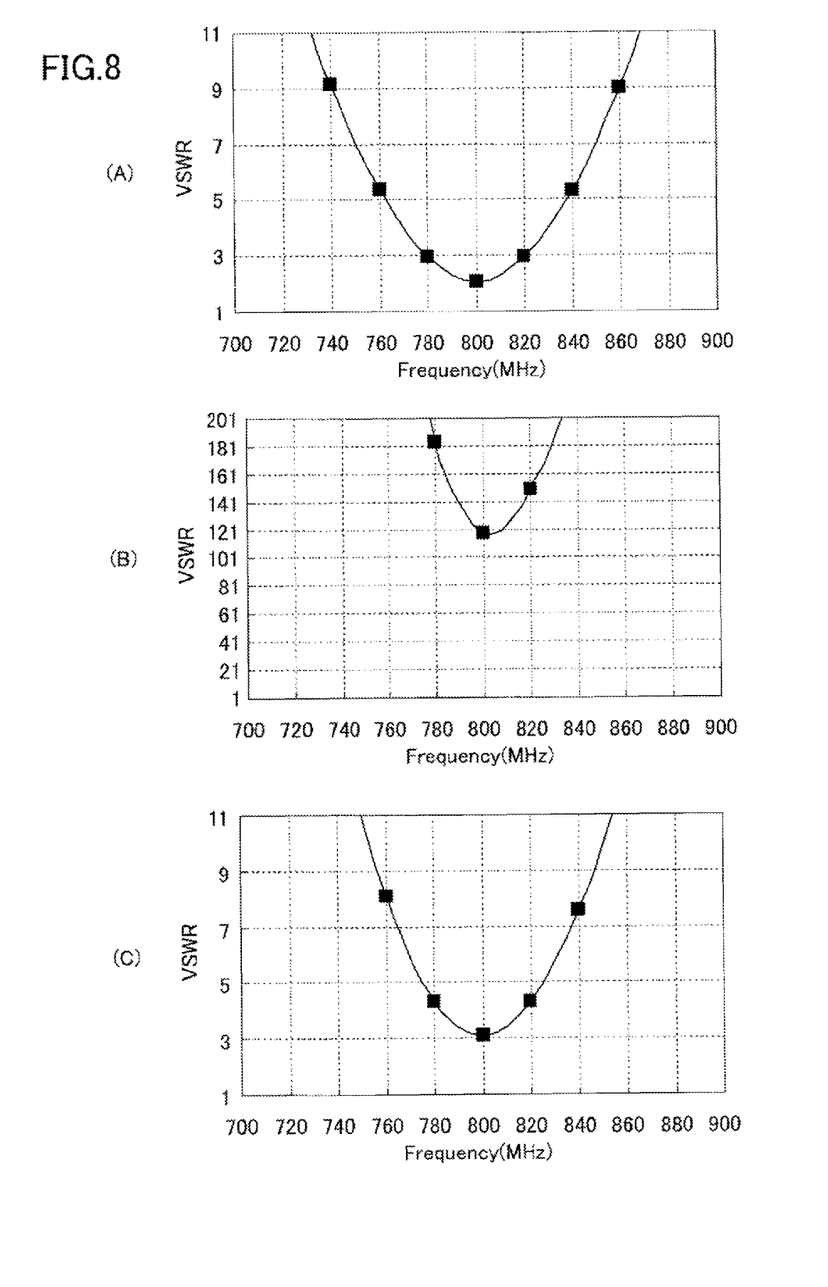
FIG. 8 is a diagram illustrating VSRW characteristics of the sub-antenna of the data communication terminal apparatus.

FIG. 8 is a diagram illustrating VSRW characteristics of the sub-antenna 110 of the data communication terminal apparatus 100. In FIG. 8, comparative VSRW characteristics are also illustrated.

Part (A) of FIG. 8 is a diagram illustrating VSRW characteristics of the sub-antenna 110 in a state where the data communication terminal apparatus 100 is connected to the laptop PC 20. Part (B) of FIG. 8 is a diagram illustrating VSRW characteristics of the sub-antenna 110 in a state where the data communication terminal apparatus 100 is not connected to the laptop PC 20.

Part (C) of FIG. 8 is a diagram illustrating VSRW characteristics of the sub-antenna 110 in a state where locations of the feeding portion 110A and the other end 110B are interchanged in the data communication terminal apparatus 100 and where the data communication terminal apparatus 100 is connected to the laptop PC 20.

The simulation result as illustrated in FIG. 8 part (A) is obtained under a condition in which inductance of the inductor 120 is 3.9 nH, capacitance of the capacitor 130 is 1.3 pF and there is no joule loss.

As illustrated in FIG. 8 part (A), according to the data communication terminal apparatus 100, the VSWR value is about 1.5 at 800 MHz. This value is very good value. Since the inductance of the inductor 120 is very small, a direct current resistance component of the inductor 120 and the extending part 112 is small enough. Accordingly, it is considered that the joule loss becomes very small in a practical sense.

This is because the loop of the current as illustrated in FIG. 7A and the current distributions as illustrated in FIG. 7B are formed in a state where the data communication terminal apparatus 100 is connected to the laptop PC 20 and therefore the ground layer 14 and the ground layer 27 are connected in an integral fashion.

The VSWR value of the data communication terminal apparatus 100 is improved greatly compared with that of the data communication terminal apparatus 10 of the comparative example.

Since degradation of radiation efficiency of the data communication terminal apparatus 100 is minimized and the antenna characteristics of the data communication terminal apparatus 100 are improved greatly, the VSWR value is improved greatly.

As illustrated in FIG. 8 part (B), VSWR value is about 120 in a case where the data communication terminal apparatus 100 is not connected to the laptop PC 20. In other words, the VSWR value as illustrated in FIG. 8 part (B) is obtained by the data communication terminal apparatus 100 by itself.

Accordingly, it is understood that in a state where the ground layer 14 and the ground layer 27 are connected to each other, they behave as a single ground layer and thereby a part of the ground layer 27 behaves as a ground plane of the sub-antenna 110 by connecting the data communication terminal apparatus 100 to the laptop PC 20 via the USB plug 15 and the USB receptacle 28. Further, it is understood that the current distribution in the ground layer 27 matches with that in the ground layer 14.

FIG. 8 part (C) illustrates the VSRW characteristics of the sub-antenna 110 in a state where locations of the feeding portion 110A and the other end 110B are interchanged in the data communication terminal apparatus 100 and where the data communication terminal apparatus 100 is connected to the laptop PC 20.

Locations of the feeding portion 110A and the other end 110B are interchanged in such a manner that the capacitor 130 is disposed at the location of the feeding portion 110A as illustrated in FIG. 6A and is connected to the ground layer 14, that the microstrip line 111 is disposed between the other end 110B and the ground layer 14, that the sub-antenna 100 is fed at the other end 110B, and that the inductor 120 is connected in parallel with the microstrip line 111 between the feeding portion and the ground layer 14.

In this case, the current flows from right to left in the sub-antenna 110 as illustrated in FIG. 6A, and flows in the ground layer 14 from left to right along the edge 14A1.

As illustrated in FIG. 8 part (C), the VSWR value is about 3 in a state where the locations of the feeding portion 110A and the other end 110B are interchanged in the data communication terminal apparatus 100 and where the data communication terminal apparatus 100 is connected to the laptop PC 20. This VSWR value is good value.

It is understood that the induced current flows from right to left as illustrated in FIG. 7B in the ground layer 27 of the laptop PC 20, because the induced current flows toward the data communication terminal apparatus 100 in the ground layer 27, in a case where the locations of the feeding portion 110A and the other end 110B are interchanged. Further, in this case, in the ground layer 14, the induced current flows from right to left in an area close to the USB plug 15.

Accordingly, although it is preferable to dispose the feeding portion 110A and the other end 110B as illustrated in FIGS. 6A and 6B, the locations of the feeding portion 110A and the other end 110B may be interchanged. In the data communication terminal apparatus 100 in which the locations of the feeding portion 110A and the other end 110B are interchanged, enhanced antenna characteristics are provided by the sub-antenna 110 and the ground layer 14 that form the loop.

Although the embodiment in which the sub-antenna 110 is formed in an L shape is described, the shape of the sub-antenna 110 is not limited to an L shape. The sub-antenna 110 may be formed in the shape other than L shape. For example, the sub-antenna 110 may be formed in an F shape.

Although the embodiment in which the sub-antenna 110 is formed in the L1 layer which is the top conductive layer of the printed circuit board 11 is described, a part of the sub-antenna 110 between the feeding portion 110A and the other end 110B may be formed by patterning a metal plate in the same shape as the shape of the sub-antenna 110 as illustrated in FIGS. 6A and 6B and may be disposed on the surface of the printed circuit board 11. In this case, the part of the sub-antenna 110 between the feeding portion 110A and the other end 110B may be connected to the microstrip line 111 and the extending part 112 via coils, solder or the like, for example. The other end 110B may be connected to the one end 130A of the capacitor 130 via coils, solder or the like, for example.

Although the embodiment in which the data communication terminal apparatus 100 is connected (attached) to the laptop PC 20 is described, the data communication terminal apparatus 100 may be connected to a computer other than the laptop PC 20.

Although the embodiment in which the data communication terminal apparatus 100 includes the USB plug 15 is described, the data communication terminal apparatus 100 may include a connector which is a different type from that of the USB plug 15. For example, the data communication terminal apparatus 100 may include a connector such as Micro-USB type.

As described above, the data communication terminal apparatus 100 includes the sub-antenna 110 in addition to the main antenna 12.

For example, according to Long Term Evolution (LTE) standard which is one of standards of high speed data communication, a communication type is defined to use two antennas using MIMO technology. One of the antenna is used when uploading data, and the two antennas are used when downloading data in order to speed up the downloading.

For example, in 2012, only a frequency band of 2 GHz is assigned to the LTE communication in Japan. But, in Japan, frequency bands of 1.5 GHz and 800 MHz will be assigned to the LTE communication in near future.

In countries or areas other than Japan, higher or lower frequency bands may be used for the high speed data communication.

Particularly, in a lower frequency band, there is a tendency that miniaturization of antenna becomes difficult and that improvement of the antenna characteristics becomes difficult, since wavelengths become longer.

If the data communication terminal apparatus 100 is used for the high speed data communication such as LTE, it is possible to improve a communication condition by using the sub-antenna 110 in addition to the main antenna 12 when downloading data.

So far, the preferred embodiments and modification of the data communication terminal apparatus are described. However, the invention is not limited to those specifically described embodiments and the modification thereof, and various modifications and alteration may be made within the scope of the inventions described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention.

Although the embodiments of the present invention have been described in detail, it should be understood that the various changes, substitutions, and alterations could be made hereto without departing from the spirit and scope of the invention.

What is claimed is:

1. A data communication terminal apparatus comprising:
a printed circuit board including:
an insulating layer having a first surface and a second surface, and
a ground plane placed on the second surface,
wherein the printed circuit board has a rectangular shape in plan view, and
wherein the ground plane has a rectangular-shaped cutoff area placed at a corner of the printed circuit board in plan view, the ground plane having a first side and a second side along the cutoff area;
a connector placed at an end portion of the printed circuit board and provided on the first surface, the connector being placed adjacent to the cutoff area in plan view;
a capacitor placed at the second side in plan view; and
an antenna formed of a conductive line and placed on the first surface or the second surface in the cutoff area in plan view, the antenna having a first end and a second end,
wherein the first end of the antenna is a feeding portion located at the first side in plan view,
wherein the second end of the antenna is connected to the second side of the ground plane via the capacitor, and
wherein the antenna is bent in L shape between the first end and the second end along two sides of the printed circuit board and forms a loop with the first side and the second side of the ground plane.

2. The data communication terminal apparatus as claimed in claim 1, further comprising a main antenna formed on the printed circuit board, the main antenna being disposed on an opposite side to that of the end portion of the printed circuit board.

3. The data communication terminal apparatus as claimed in claim 1, wherein the capacitor is a capacitor chip mounted on the printed circuit board, or a capacitor formed by a first edge portion of the antenna and a second edge portion of the ground plane, the first edge portion and the second edge portion facing each other in plan view.

4. The data communication terminal apparatus as claimed in claim 1, wherein the antenna is formed by patterning a conductive layer of the printed circuit board.

5. The data communication terminal apparatus as claimed in claim 1, wherein the antenna is formed by patterning a metal plate.

6. The data communication terminal apparatus as claimed in claim 1, wherein the two sides are connected at the corner of the printed circuit board.

7. The data communication terminal apparatus as claimed in claim 1, further comprising an inductor placed at the first side in plan view,
   wherein the antenna has an extending part extending from the first end, and
   wherein the inductor connects the extending part and the ground plane.

8. A data communication terminal apparatus comprising:
   a printed circuit board including:
      an insulating layer having a first surface and a second surface, and
      a ground plane placed on the second surface,
      wherein the printed circuit board has a rectangular shape in plan view, and
      wherein the ground plane has a rectangular-shaped cutoff area placed at a corner of the printed circuit board in plan view, the ground plane having a first side and a second side along the cutoff area;
   a connector placed at an end portion of the printed circuit board and provided on the first surface, the connector being placed adjacent to the cutoff area in plan view;
   a capacitor placed at the first side in plan view; and
   an antenna formed of a conductive line and placed on the first surface or the second surface in the cutoff area in plan view, the antenna having a first end and a second end,
   wherein the first end of the antenna is a feeding portion located at the second side in plan view,
   wherein the second end of the antenna is connected to the first side of the ground plane via the capacitor, and
   wherein the antenna is bent in L shape between the first end and the second end along two sides of the printed circuit board and forms a loop with the first side and the second side of the ground plane.

9. The data communication terminal apparatus as claimed in claim 8, further comprising a main antenna formed on the printed circuit board, the main antenna being disposed on an opposite side to that of the end portion of the printed circuit board.

10. The data communication terminal apparatus as claimed in claim 8, wherein the capacitor is a capacitor chip mounted on the printed circuit board, or a capacitor formed by a first edge portion of the antenna and a second edge portion of the ground plane, the first edge portion and the second edge portion facing each other in plan view.

11. The data communication terminal apparatus as claimed in claim 8, wherein the antenna is formed by patterning a conductive layer of the printed circuit board.

12. The data communication terminal apparatus as claimed in claim 8, wherein the antenna is formed by patterning a metal plate.

13. The data communication terminal apparatus as claimed in claim 8, wherein the two sides are connected at the corner of the printed circuit board.

14. The data communication terminal apparatus as claimed in claim 8, further comprising an inductor placed at the second side in plan view,
   wherein the antenna has an extending part extending from the first end, and
   wherein the inductor connects the extending part and the ground plane.

* * * * *